United States Patent [19]
Boyd

[11] Patent Number: 5,484,476
[45] Date of Patent: Jan. 16, 1996

[54] METHOD FOR PREHEATING FLY ASH

[75] Inventor: Thomas J. Boyd, Huntersville, N.C.

[73] Assignee: Electric Power Research Institute, Inc., Palo Alto, Calif.

[21] Appl. No.: 179,677

[22] Filed: Jan. 11, 1994

[51] Int. Cl.⁶ .......................... C04B 18/06; C04B 14/36; C04B 20/04
[52] U.S. Cl. .................. 106/405; 106/478; 106/DIG. 1
[58] Field of Search .................. 106/405, 478, 106/DIG. 1; 264/DIG. 49

[56] References Cited

U.S. PATENT DOCUMENTS

| | | | |
|---|---|---|---|
| 3,979,168 | 9/1976 | Chauvin | 106/DIG. 1 |
| 4,304,659 | 12/1981 | Pratt et al. | 208/164 |
| 4,435,364 | 3/1984 | Vorres | 422/145 |
| 4,465,021 | 8/1984 | Richter et al. | 122/4 D |
| 4,617,877 | 10/1986 | Gamble | 110/216 |
| 4,622,904 | 11/1986 | Murphy et al. | 110/263 |
| 4,648,329 | 3/1987 | Couarch'h et al. | 110/245 |
| 4,663,507 | 5/1987 | Trerice | 106/DIG. 1 |
| 4,736,711 | 4/1988 | Marlair et al. | 110/245 |
| 4,739,715 | 4/1988 | Couarc'h et al. | 110/346 |
| 4,817,540 | 4/1989 | Razbin et al. | 110/266 |
| 4,843,981 | 4/1989 | Goldbach et al. | 110/347 |
| 4,959,334 | 9/1990 | Manleon et al. | 502/39 |
| 4,961,756 | 10/1990 | Rich, Jr. | 44/605 |
| 4,969,404 | 11/1990 | Virr | 110/245 |
| 4,981,111 | 1/1991 | Bennett et al. | 110/106 |
| 5,014,651 | 5/1991 | Cummings | 110/245 |
| 5,070,821 | 12/1991 | Virr | 110/245 |
| 5,160,539 | 11/1992 | Cochran | 106/347 |
| 5,161,471 | 11/1992 | Piekos | 110/245 |
| 5,190,451 | 3/1993 | Goldbach | 431/5 |
| 5,236,354 | 8/1993 | Goldbach et al. | 60/39.02 |

Primary Examiner—Mark L. Bell
Assistant Examiner—Michael Marcheschi
Attorney, Agent, or Firm—Flehr, Hohbach, Test, Albritton & Herbert

[57] ABSTRACT

A method for preheating particles of carbonaceous fly ash prior to injecting the particles of fly ash into a combustor. In the method, the particles of fly ash are introduced into a preheating vessel. The particles of fly ash are heated in the preheating vessel to a temperature at least approximately equal to their autoignition temperature to form preheated particles of fly ash. The preheated particles of fly ash are then injected into the combustor. The heating of the particles of fly ash in the preheating vessel decreases the amount of time the particles of fly ash are in the combustor below the autoignition temperature and thereby increases the amount of carbon in the particles of fly ash oxidized within the combustor. An apparatus is provided for performing the method of the invention.

13 Claims, 1 Drawing Sheet

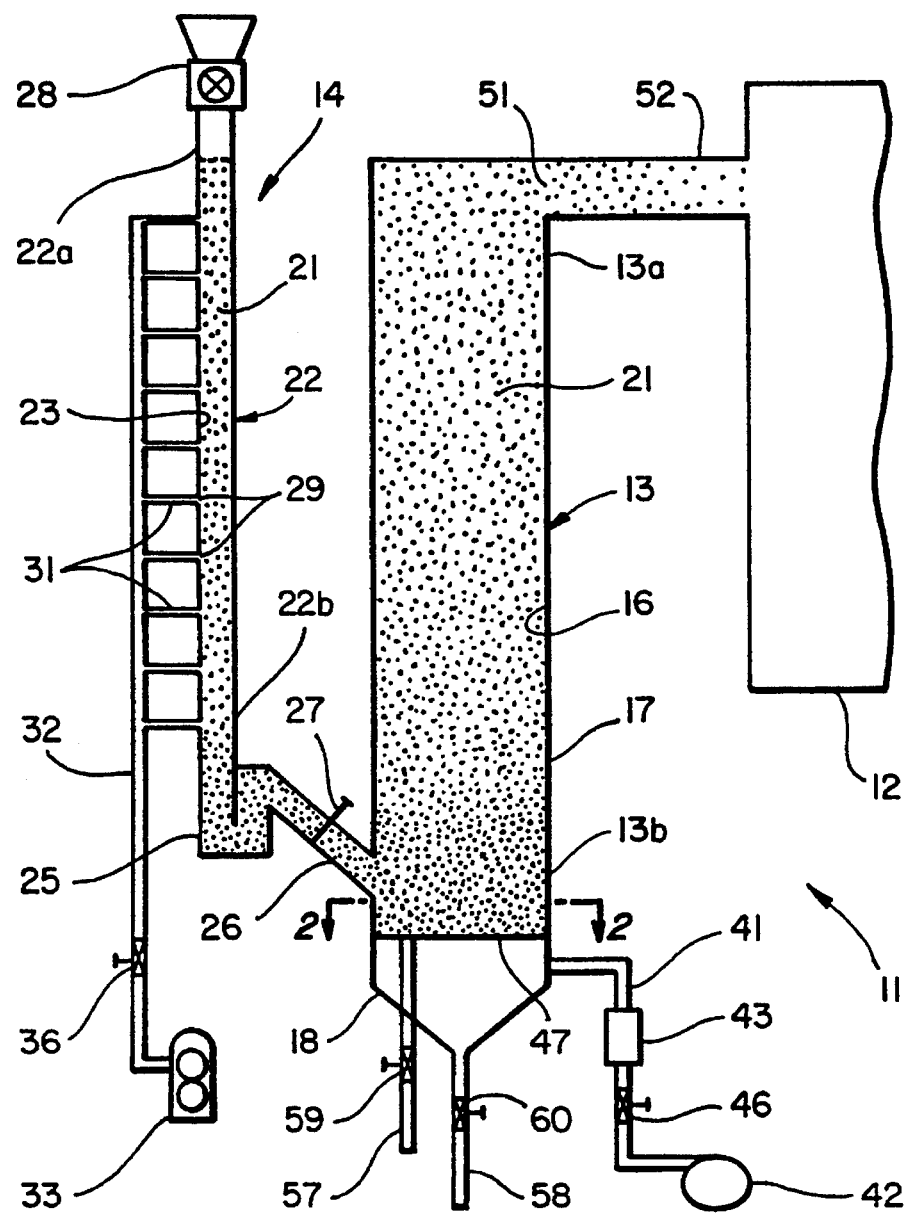
FIG_1
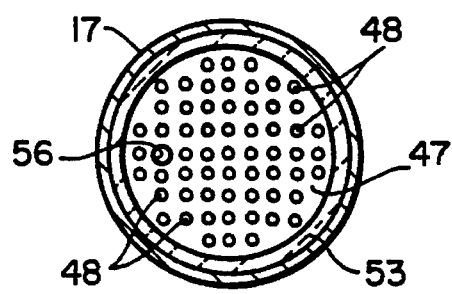
FIG_2

METHOD FOR PREHEATING FLY ASH

BRIEF DESCRIPTION OF THE INVENTION

This invention relates to processes and apparatus for reducing the carbon content of particles of fly ash and more particularly to processes and apparatus for reducing the carbon content of particles of fly ash by carbon burnout.

BACKGROUND OF THE INVENTION

As particulate controls for coal fired power plants have become more efficient, more waste is being contained within the plant and producing byproducts which require specialized disposal. In addition, the potential retrofit of older power plants with low-$NO_x$ burner technology so as to meet more stringent air emission regulations may result in byproducts having a higher carbon content. Fly ash is one of these byproducts which is increasingly becoming a disposal problem.

Much fly ash has a relatively high carbon content. For example, fly ash generated by the combustion of eastern bituminous coal in a pulverized coal-fired boiler retrofitted with low-$NO_x$ burners typically has a carbon content of greater than six percent. Although certain fly ash can be used as pozzolan and replace a portion of the cement in concrete, fly ash with a carbon content of greater than four percent cannot usually be sold for this purpose. As a result, there is often no beneficial use for fly ash having a relatively high carbon content. Furthermore, the outright disposal of such fly ash in landfills or otherwise is often complicated by its carbon content.

The particle size and heating value of fly ash make it difficult to beneficiate with conventional techniques which oxidize carbon therein so as to reduce the carbon content to acceptable levels. Direct combustion techniques, including reinjection of the fly ash into a power plant, have been examined and tested in the past. These techniques, however, have resulted in little or no further carbon reduction due to the insufficient residence time of the fly ash in the combustors. More specifically, the fly ash spends a valuable portion of its limited time in the combustor being heated to its autoignition temperature, the temperature at which the oxidation of the carbon in the fly ash accelerates greatly. As a result, the fly ash spends an inadequate amount of time in the combustor at a temperature at or above its autoignition temperature to reduce its carbon content to a desirable level.

OBJECTS AND SUMMARY OF THE INVENTION

The primary object of the present invention is to provide a method and apparatus which can be used with a combustion system to reduce the carbon content in fly ash particles through further combustion.

Another object of the invention is to provide a method and apparatus of the above character in which the fly ash particles are preheated prior to injection into a combustor so as to reduce the time the fly ash particles are in the combustor being preheated to an optimal oxidation temperature.

Another object of the present invention is to provide a method and apparatus of the above character which can be used to increase the combustion efficiency of certain power plants utilizing low-$NO_x$ burner technology.

Another object of the present invention is to provide a method and apparatus in which the further combusted fly ash particles are beneficiated so that they can be used as a pozzolan to replace a portion of the cement in concrete.

These and other objects are achieved by a method for preheating particles of carbonaceous fly ash prior to injecting the particles of fly ash into a combustor. In the method, the particles of fly ash are introduced into a preheating vessel. The particles of fly ash are heated in the preheating vessel to a temperature at least approximately equal to their autoignition temperature to form preheated particles of fly ash. The preheated particles of fly ash are then injected into the combustor. The heating of the particles of fly ash in the preheating vessel decreases the amount of time the particles of fly ash are in the combustor below the autoignition temperature and thereby increases the amount of carbon in the particles of fly ash oxidized within the combustor. An apparatus is provided for performing the method of the invention.

Additional objects and features of the invention will appear from the following description from which the preferred embodiments are set forth in detail in conjunction with the accompanying drawings.

BRIEF DESCRIPTION OF THE DRAWINGS

FIG. 1 is a schematic view of a combustor system which includes the apparatus for preheating particles of carbonaceous fly ash of the present invention.

FIG. 2 is a cross-sectional view taken along the line 2—2 of the apparatus for preheating particles of carbonaceous fly ash shown in FIG. 1.

DETAILED DESCRIPTION OF THE INVENTION

Reference will now be made in detail to the preferred embodiment of the invention which is illustrated in the accompanying figures. The description of the embodiment of the invention will be followed by a discussion of its operation.

Apparatus 11 of the present invention is for preheating fine particles of fly ash prior to injection into a combustor. The apparatus can be used with existing combustion systems, such as pulverized coal steam generators known to those skilled in the art, or with new combustion system designs. In general, these combustion systems include a combustor 12 which can be in the form of a boiler utilized in many pulverized coal steam generators. As illustrated in FIG. 1, where the components of the system therein are not shown to scale, apparatus 11 includes a cylindrical-like preheating container or vessel known as a fluidized riser 13 and a seal leg feed assembly 14 for introducing particles of fly ash into fluidized riser 13.

Fluidized riser 13 is made from a suitable material such as refractory lined pipe and has opposite top and bottom portions 13a and 13b. An internal chamber or passageway 16 which extends from bottom portion 13b to top portion 13a is formed by an outer wall 17. As such, fluidized riser 13 is generally tubular in shape, wall 17 being generally circular in cross-section as shown in FIG. 2. Bottom portion 13b of the fluidized riser has a generally closed bottom end in the form of plenum 18 and top portion 13a has an opposite generally closed top end. The generally cylindrical chamber 16 within the fluidized riser has a height ranging from 5 to 15 feet and a diameter ranging from 0.5 to 4 feet and preferably 0.5 to 2 feet.

Feed assembly 14 is included within the means for introducing fine particles of fly ash 21 into chamber 16. Feed assembly 14 is formed from a vertically disposed tubular member or tube 22 made from a suitable material such as carbon steel pipe. Feed tube 22 has top and bottom end portions 22a and 22b and a central bore 23 extending therebetween. A J valve 25 is provided at bottom end portion 22b and inlet line 26 serves to connect the J valve to bottom portion 13b of the fluidized riser. An isolation valve 27 is provided in line 26 for use during start-up of apparatus 11. A feed control system in the form of a rotary feeder 28 is mounted to top end portion 22a of feed tube 22 for feeding fly ash particles 21 into this tube.

Feed tube 22 is aerated so as to fluidize the particles of fly ash therein. In this regard, tube 22 is provided with a plurality of ports 29 longitudinally spaced apart thereon. A plurality of capillary tubes 31 serve to connect an aeration line 32 to ports 29. An air displacement device such as compressor 33 is joined to the end of aeration line 32 and serves to force air through the aeration line and capillary tubes into feed tube 22. A valve 36 is provided in aeration line 32 to control or stop the flow of air into the feed tube.

Apparatus 11 has means for supplying air to fluidized riser 13 to permit combustion of fly ash particles 21 introduced therein by feed assembly 14. The supplying means includes an air line 41 joined to plenum 18 at one end and to an air displacement device such as forced air fan 42 at the other end. A suitable start-up burner 43, such as a natural gas system, is provided on air line 41 for initiating the preheating process within fluidized riser 13. A control valve 46 is provided on air line 41 between fan 42 and start-up burner 43 and is included within the means for controlling the amount of air introduced into chamber 16 from fan 42.

An air distributor or grid plate 47 extends across bottom portion 13b of the fluidized riser above plenum 18 and serves to distribute the air introduced therein from air line 41 across the bottom of chamber 16 (see FIG. 2). In this regard, grid plate 47 is provided with a pattern of holes 48 which extend through the two opposite surfaces thereof.

An outlet port 51 is provided at top portion 13a of fluidized riser 13 for permitting the preheated fly ash particles 21 to be removed and flow from chamber 16 into combustor 12. Outlet port 51 is coupled to combustor 12 and, as shown in the drawings, a vent pipe 52 is joined at one end to the outlet port and at the other end to the combustor. In this manner, apparatus 11 injects the fly ash particles into combustor 12 by permitting the upward rising particles to flow into the combustor. Outer wall 17 of fluidized riser 13 is further provided with a refractory lining 53, shown in cross-section in FIG. 2, which serves to insulate and retain heat within the fluidized riser. Lining 53 is included within the means for heating the particles of fly ash as they pass through the fluidized riser.

Drains are provided on fluidized riser 13 for removing rocks, particles and other material which do not rise through chamber 16 and exit outlet port 51. Grid plate 47 has an additional drain hole 56, larger than the other holes 48 therein, which is joined to a first drain pipe 57. A second drain pipe 58 is connected to the bottom of plenum 18 for removing other materials which have dropped through grid plate 47 or have otherwise settled to the bottom of the plenum. Valves 59 and 60 are provided on pipes 57 and 58, respectively, for controlling the outflow therethrough.

In operation and use, apparatus 11 operates as an integrated fly ash preheater and reinjection system which, as indicated above, may be adapted to existing or new combustion systems for increasing the combustion efficiency of these systems. It may also be integrated into an overfire air system as part of a low-$NO_x$ retrofit for controlling loss on ignition. In general, apparatus 11 processes particles of carbonaceous fly ash 21 generated from a combustion process. The preprocessed fly ash particles enter apparatus 11 with a temperature ranging from ambient to 600° F. and preferably at a temperature of approximately 200° F. Apparatus 11 preheats fly ash particles 21 to a temperature at least approximately equal to the autoignition temperature of the particles before injecting these preheated fly ash particles into combustor 12.

For initiating the process of apparatus 11, fly ash particles 21 are introduced into fluidized riser 13. The amount of fly ash particles introduced into the fluidized riser is controlled by rotary feeder 28 which feeds the particles into feed tube 22. Once within the feed assembly, the particles of fly ash form a column within feed tube 22. The aeration of this column of fly ash particles by compressor 33 causes the particles to fluidize and resemble a column of fluid having a pressure which increases downwardly through the feed tube. During fill-up of fluidized riser 13, the pressure at bottom end portion 22b is greater than the pressure in the fluidized riser so as to cause fly ash particles 21 to flow into and fill the fluidized riser.

Air supplied through air line 41 into chamber 16 fluidizes the fly ash particles 21 in fluidized riser 13. The supplied air is distributed across bottom portion 13b by grid plate 47 so as facilitate the fluidization of the fly ash particles. The suspension density of fly ash particles 21 within fluidized riser 13 depends on the density of the particles and can range from approximately 10 to 60 $lb/ft^3$ and preferably from 10 to 35 $lb/ft^3$. The suspension density is lower at top portion 13a than at bottom portion 13b.

J valve 25 in feed assembly 14 for introducing the fly ash particles into chamber 16 operates without the need of any moving valve parts. In this regard, the fluidized particles of fly ash 21 within fluidized riser 13 resemble a column of fluid having a pressure which increases downwardly therein to a pressure at bottom portion 13b of approximately 2.5 psig. The pressure at bottom end portion 22b of feed tube 22 is at least as great as the pressure at the bottom of fluidized riser 13 and serves as a back pressure to preclude particles of fly ash within chamber 16 from travelling out through inlet line 26 back into feed assembly 14.

For commencing the combustion within fluidized riser 13, the supplied air is initially heated by start-up burner 43 until the temperature in chamber 16 reaches the autoignition temperature of fly ash particles 21. The mixing of fly ash particles 21 and heated air within chamber 16 causes a combustive reaction in which at least a portion of the carbon in the fly ash particles is oxidized. The heat generated by this reaction serves as a continuous supply of heat after start-up for preheating the fly ash particles within fluidized riser 13. In this manner, the preheating process of the present invention is fueled by a portion of the carbon in the fly ash particles and is thereby self-sustaining. Start-up burner 43 is required only for commencing the process of apparatus 11, no external fuel source being required thereafter.

During operation of fluidized riser 13, fly ash particles 21 are continuously fed by rotary feeder 28 into feed tube 22 of feed assembly 14. As appreciated by those skilled in the art of manometers, the addition of fly ash particles into feed tube 22 causes the pressure at the bottom thereof to increase to an amount greater than the pressure at the bottom of the fluidized riser and thereby force fly ash particles into chamber 16. This introduction of fly ash particles into the chamber causes the fluidized fly ash particles therein to rise while being heated. Feed tube 22 is elevationally sized and outlet port 51 within fluidized riser 13 is elevationally positioned so that the addition of fly ash particles 21 into the feed tube by the rotary feeder, and the fly ash suspension density difference between the columns of feed tube 22 and fluidized riser 13, causes fluidized fly ash particles within riser 13 to exit the outlet port. Particle elutriation within fluidized riser 13 is minimized by controlling the outflow of rotary feeder 28 so that the riser velocity, that is the velocity of the air and particles of fly ash rising through chamber 16, is maintained at relatively low values. In this regard, it is preferable that the riser velocity range from approximately 0.5 to 2 feet per second. This relatively low riser velocity also prevents the fluidized riser from merely blowing the fly ash particles out of chamber 16.

After start-up, the operating temperature within fluidized riser 13 is controlled by the aeration of chamber 16 and by the fly ash material through-put. The amount of air supplied into the chamber for a given amount of fly ash particles 21 being introduced therein is regulated by control valve 46 so that the combustion process of fluidized riser 13 operates at substoichiometric conditions. By so operating the fluidized riser in an oxygen-starved condition, the amount of heat generated within chamber 16 is limited not by the amount of carbon in the fly ash particles, but rather by the amount of available air having oxygen for oxidizing this carbon. Since the oxygen supply can be regulated at a constant level, the heat-generating process within the chamber is self-limiting and a generally constant operating temperature can be maintained regardless of the carbon content of the fly ash particles introduced into fluidized riser 13. It should be appreciated that under certain conditions the fluidized riser could be operated under stoichiometric conditions and be within the scope of the present invention.

As so operated, apparatus 11 serves to heat fly ash particles 21 to a temperature of at least 900° F. More specifically, fly ash particles 21 are heated by apparatus 11 to a temperature ranging from approximately 900° to 1500° F. and preferably to a temperature ranging from approximately 1000° to 1200°. The fly ash particles are retained within fluidized riser 13 for a residence time of at least 5 seconds and preferably for a residence time ranging from approximately 5 to 30 seconds.

Once fly ash particles 21 have risen to the top of fluidized riser 13, they exit the fluidized riser through vent pipe 52 and are injected into combustor 12 for further combusting. The preheated particles of fly ash enter the combustor at a temperature at least generally equal to the autoignition temperature of the fly ash and minimize the amount of time the particles would otherwise be preheated to this temperature within the combustor. In the combustor, the residual carbon in fly ash particles 21 is combusted under oxidation conditions in a generally oxygen-rich environment so as to maximize the carbon burnout in the fly ash. In this manner, apparatus 11 increases the amount of carbon in the particles of fly ash which is oxidized within combustor 12 and serves to increase the carbon conversion and combustion efficiency of the combined combustion system. In addition, the fly ash particles so beneficiated by apparatus 11 and combustor 12 can be used as a pozzolan in concrete.

Although the carbon content of fly ash particles 21 to be introduced into apparatus 11 can vary, it is preferable that these particles have a carbon content of at least approximately two percent and preferably at least approximately three percent. During the preheating process of the present invention, approximately two percent of this carbon will be oxidized in the controlled partial combustion within fluidized riser 13. The design basis for heat release is based on the energy required to bring the particles of fly ash up to the desired operating temperature.

Apparatus 11 is relatively simple in design and, as a result, relatively inexpensive. Both fluidized riser 13 and feed tube 22 contain no moving parts. Apparatus 11 and the process thereof are also more versatile than other processes currently available. It should be appreciated that the preheating process described herein could be performed with a fluidized bed reactor and be within the scope of the present invention.

As can be seen from the foregoing, a method and apparatus have been provided which can be used with a combustion system to reduce the carbon content in fly ash particles through further combustion. In the method and apparatus, the fly ash particles are preheated prior to injection into a combustor so as to reduce the time the fly ash particles are in the combustor being heated to an optimal oxidation temperature. The method and apparatus utilize the hydrodynamics possible with air and fine particles, obtaining conditions suitable to burn fine particles of fly ash of relatively low heating value in a self sustaining system in which no auxiliary fuel and co-firing is required. The apparatus of the invention provides the residence times and control of particle elutriation necessary to combust the fly ash particles for recovering heat and reducing the carbon content thereof.

The method and apparatus can be used to increase the combustion efficiency of certain power plants utilizing low-$NO_x$ burner technology. The further combusted fly ash particles are beneficiated so that they can be used as a pozzolan to replace a portion of the cement in concrete.

What is claimed is:

1. A method for preheating particles of carbonaceous fly ash having an autoignition temperature in a preheating vessel having lower and upper portions with approximately equivalent suspension densities prior to injecting the particles of fly ash into a combustor where the particles of fly ash are combusted under oxidation conditions comprising the steps of introducing the particles of fly ash into the lower portion of the preheating vessel, heating the particles of fly ash in the preheating vessel to a temperature approximately equal to said autoignition temperature to form preheated particles of fly ash and introducing additional particles of fly ash into the lower portion of the preheating vessel so as to cause the preheated particles of fly ash to be injected from the upper portion of the preheating vessel into the combustor, the heating of the particles of fly ash in the preheating vessel decreasing the amount of time the particles of fly ash are in the combustor below the autoignition temperature and thereby increasing the amount of carbon in the particles of fly ash oxidized within the combustor.

2. The method of claim 1 wherein said heating step includes combusting at least a portion of the carbon in the particles of fly ash.

3. The method of claim 2 further comprising the step of supplying air to the preheating vessel, the supplying step including controlling the amount of air supplied to the preheating vessel so that the amount of carbon in the particles of fly ash that oxidizes is regulated under substoichiometric conditions.

4. The method of claim 3 wherein said introducing step includes selecting particles of fly ash having a carbon content of at least approximately two percent.

5. The method of claim 1 wherein said heating step includes heating the particles of fly ash to a temperature ranging from approximately 900° to 1500° F.

6. The method of claim 5 wherein said heating step includes heating the particles of fly ash to a temperature ranging from approximately 1000° to 1200° F.

7. The method of claim 1 further comprising the step of operating the preheating vessel so that the velocity of the air and particles of fly ash therein ranges from approximately 0.5 to 2 feet per second.

8. The method of claim 7 wherein said operating step includes operating the preheating vessel so that the particles of fly ash have a suspension density therein ranging from approximately 10 to 35 lb/ft$^3$.

9. The method of claim 1 further comprising the step of retaining the particles of fly ash in the preheating vessel for a residence time of at least 5 seconds.

10. The method of claim 9 wherein said retaining step includes retaining the particles of fly ash in the preheating vessel for a residence time ranging from approximately 5 to 30 seconds.

11. A method for preheating particles of carbonaceous fly ash prior to injecting the particles of fly ash into a combustor where the particles of fly ash are combusted under oxidation conditions comprising the steps of mixing the particles of fly ash with air in a preheating vessel, heating the particles of fly ash in the preheating vessel to a temperature of at least approximately 900° F. to form preheated particles of fly ash, the particles of fly ash being heated by oxidizing at least a portion of the carbon therein, controlling the amount of air allowed into the preheating vessel so that the amount of carbon oxidized in the particles of fly ash is regulated under substoichiometric conditions and injecting the preheated particles of fly ash into the combustor, the heating of the particles of fly ash in the preheating vessel facilitating carbon burnout in the particles of fly ash after they have been injected into the combustor.

12. The method of claim 11 wherein the preheating vessel has a bottom and wherein the injecting step includes introducing additional particles of fly ash into the bottom of the preheating vessel so as to cause the preheated particles of fly ash to rise within the preheating vessel while being heated therein.

13. The method of claim 11 further comprising the step of retaining the particles of fly ash in the preheating vessel for a residence time ranging from approximately 5 to 30 seconds.

* * * * *